(12) United States Patent
Wake et al.

(10) Patent No.: US 9,520,606 B2
(45) Date of Patent: Dec. 13, 2016

(54) FUEL CELL SYSTEM AND CONTROL METHOD THEREOF

(75) Inventors: Chihiro Wake, Saitama (JP); Yuji Matsumoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1122 days.

(21) Appl. No.: 13/477,350

(22) Filed: May 22, 2012

(65) Prior Publication Data

US 2012/0301803 A1 Nov. 29, 2012

(30) Foreign Application Priority Data

May 24, 2011 (JP) .................................. 2011-116281

(51) Int. Cl.
*H01M 8/04* (2016.01)
*B60L 1/00* (2006.01)
(Continued)

(52) U.S. Cl.
CPC ............ *H01M 8/0488* (2013.01); *B60L 1/003* (2013.01); *B60L 7/14* (2013.01); *B60L 11/005* (2013.01); *B60L 11/1803* (2013.01); *B60L 11/1868* (2013.01); *B60L 11/1887* (2013.01); *B60L 11/1898* (2013.01); *B60L 15/2009* (2013.01); *H01M 8/0491* (2013.01); *H01M 8/04559* (2013.01); *H01M 8/04753* (2013.01);
(Continued)

(58) Field of Classification Search
CPC .............. H01M 8/0488; H01M 8/0491; H01M 8/04955; H01M 8/04753
See application file for complete search history.

(56) References Cited

U.S. PATENT DOCUMENTS

2007/0231637 A1* 10/2007 Shibata ............. H01M 8/04223
429/429
2007/0237989 A1 10/2007 Norimatsu et al.
(Continued)

FOREIGN PATENT DOCUMENTS

CN 101051695 A 10/2007
CN 101257125 A 9/2008
(Continued)

OTHER PUBLICATIONS

Chinese Office Action application No. 201210159875.7 issued Apr. 24, 2014.

*Primary Examiner* — Barbara Gilliam
*Assistant Examiner* — Stephan Essex
(74) *Attorney, Agent, or Firm* — Squire Patton Boggs (US) LLP

(57) ABSTRACT

A fuel cell system includes an ECU that sets the fuel cell stack to a state of idling stop by lowering both a revolution speed of an air pump and a discharge current value of the fuel cell stack to less than during idling power generation within a range larger than 0, in response to a predetermined idling stop initiation condition having been satisfied during idling power generation. The ECU decreases the discharge current value further as the lowest cell voltage value CV_low of the fuel cell stack decreases so that the lowest cell voltage value CV_low does not fall below a cancellation threshold B, with an event of the lowest cell voltage CV_low of the fuel cell stack having fallen below the cancellation threshold B as a cancellation condition of idling stop.

12 Claims, 5 Drawing Sheets

(51) Int. Cl.
*B60L 7/14* (2006.01)
*B60L 11/00* (2006.01)
*B60L 11/18* (2006.01)
*B60L 15/20* (2006.01)
*H01M 8/10* (2016.01)

(52) U.S. Cl.
CPC ..... *H01M 8/04955* (2013.01); *B60L 2210/10* (2013.01); *B60L 2240/421* (2013.01); *B60L 2240/423* (2013.01); *B60L 2240/547* (2013.01); *B60L 2240/549* (2013.01); *H01M 2008/1095* (2013.01); *H01M 2250/20* (2013.01); *Y02E 60/50* (2013.01); *Y02T 10/645* (2013.01); *Y02T 10/7022* (2013.01); *Y02T 10/7066* (2013.01); *Y02T 10/7216* (2013.01); *Y02T 10/7275* (2013.01); *Y02T 90/32* (2013.01); *Y02T 90/34* (2013.01)

(56) References Cited

U.S. PATENT DOCUMENTS

2010/0203408 A1* 8/2010 Ono .................. H01M 8/04619
429/431
2013/0095404 A1 4/2013 Shibata et al.

FOREIGN PATENT DOCUMENTS

| JP | 2006-294304 A | 10/2006 |
| JP | 2009-266475 A | 11/2009 |

\* cited by examiner

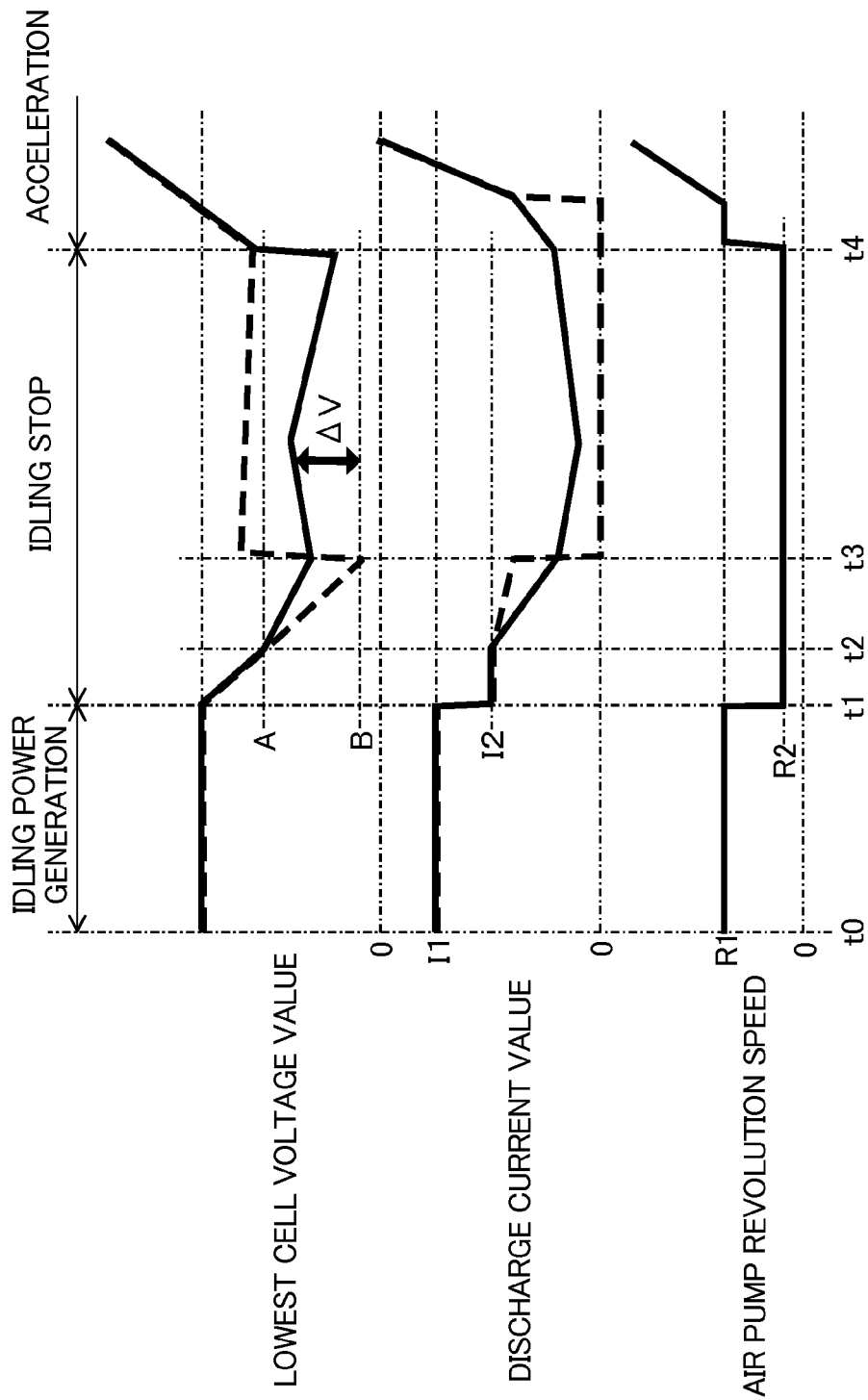

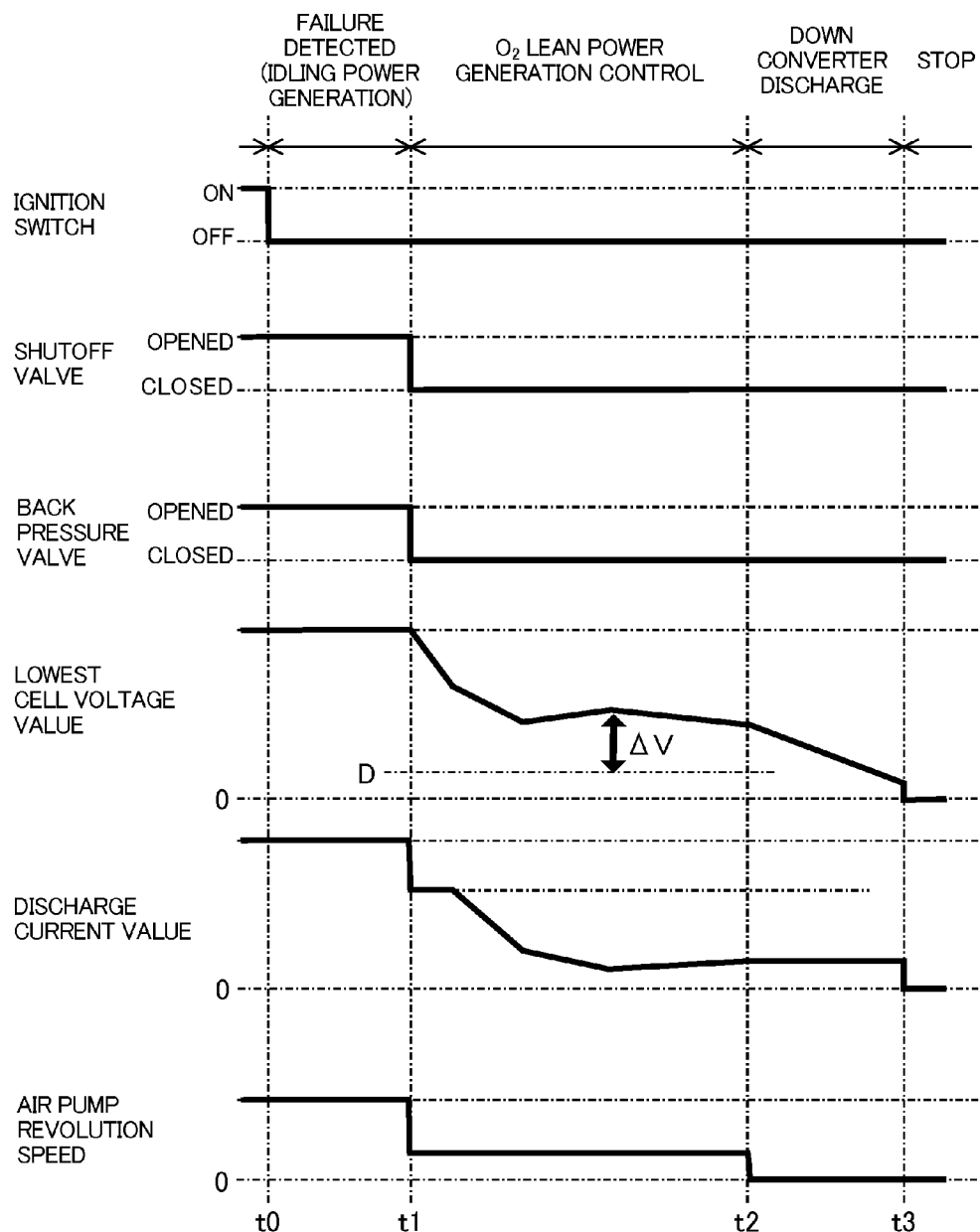

FUEL CELL SYSTEM AND CONTROL METHOD THEREOF

This application is based on and claims the benefit of priority from Japanese Patent Application No. 2011-116281, filed on 24 May 2011, the content of which is incorporated herein by reference.

BACKGROUND OF THE INVENTION

Field of the Invention

The present invention relates to a fuel cell system and a control method thereof.

Related Art

In recent years, fuel cell systems have received attention as a new source of power for automobiles. Fuel cell systems are provided with a fuel cell stack that generates power by allowing reactant gases (hydrogen and air) to undergo a chemical reaction, and reactant gas supply devices that supply reactant gases to the fuel cell via reactant gas channels, for example. The fuel cell stack is a stack structure in which from several tens to several hundreds of fuel cells are layered. In this regard, each fuel cell is configured by sandwiching a membrane electrode assembly (MEA) with a pair of separators, and the membrane electrode assembly is configured by the two electrodes of an anode and a cathode, and a solid polymer electrolyte membrane sandwiched by these electrodes.

In order to suppress the consumption amount of reactant gases as much as possible in a fuel cell vehicle with such a fuel cell system as the source of power, it is preferable to stop the supply of reactant gases to the fuel cell stack in a case of power generation being continually performed in an idle operation state such as while waiting at a traffic light, for example. Patent Document 1 proposes a technology to consume the hydrogen and oxygen staying in the fuel cell stack and system to prevent the fuel cell stack from being left as is in a high-voltage state, thereby suppressing degradation of the fuel cell stack, by continually producing generated electric current from the fuel cell stack, i.e. by continuing discharge of the fuel cell stack, even after stopping the supply of such reactant gases.

Patent Document 1: Japanese Unexamined Patent Application, Publication No. 2006-294304

SUMMARY OF THE INVENTION

However, if the supply of reactant gas is completely stopped as with the above-mentioned technology of Patent Document 1, the oxygen and hydrogen remaining in the vicinity of the MEA will react and the catalyst may deteriorate; therefore, it has been known to be preferable to continually supply even a slight amount of reactant gases also during idling stop. Therefore, by supplying reactant gas at low flowrate and continuing discharge during idling stop, it is possible to suppress both degradation due to the reaction of oxygen and hydrogen in the vicinity of the MEA, and degradation due to the fuel cell stack entering a high-voltage state.

However, the power generation stability of the stack in the so-called low stoichiometry state continually generating power under the supply of a low flowrate of reactant gas tends to change greatly depending on the suitability of the state of the cells at this time, and the cell voltage will rapidly decline in a case of being poor, and it may become difficult to continue to maintain the power generation in such a low stoichiometry state for a long time period.

The present invention has an object of providing a fuel cell system that can maintain power generation in a low stoichiometry state over a long time period irrespective of the state of the cells at this time, and a control method thereof.

In order to achieve the above-mentioned object, the present invention provides a fuel cell system including: a fuel cell stack (e.g., the fuel cell stack 10 described later) having stacked together a plurality of fuel cells that generate power when supplied fuel gas and oxidant gas; an electrical load (e.g., the motor 20, air pump 31, and high-voltage battery 50 described later) that is connected to the fuel cell stack and consumes electric power generated by the fuel cell stack; and a control unit (e.g., the ECU 70 described later) that executes low stoichiometry control to decrease both a supplied amount of oxidant gas to the fuel cell stack and a generated electric current produced from the fuel cell stack to less than during idling power generation within a range greater than zero. The control unit decreases the generated electric current produced from the fuel cell stack as a lowest cell voltage value (e.g., the lowest cell voltage value CV_low described later) of the fuel cell stack decreases, so that the lowest cell voltage value of the fuel cell stack does not fall below a predetermined threshold (e.g., the cancellation threshold B), during execution of the low stoichiometry control.

With the present invention, since it is thereby possible to prevent oxygen staying in the vicinity of the MEA of each fuel cell from coexisting with hydrogen, and to avoid the fuel cell stack from entering a high-voltage state, by executing low stoichiometry control to decrease both the supplied amount of oxidant gas to the fuel cell stack and the generated electric current produced by the fuel cell stack to less than during idling power generation within a range greater than 0, the fuel cell stack can be suppressed from deteriorating.

In addition, with the present invention, the generated electric current produced from the fuel cell stack is lowered as the lowest cell voltage value decreases, during execution of the above-mentioned low stoichiometry control in which the power generation stability tends to be influenced by the cell state. It is thereby possible to prevent the lowest cell voltage value from declining so far as to fall below the predetermined threshold, even in a case of the cell state not being favorable, and thus power generation can be maintained in a low stoichiometry state over a long time period.

In this case, it is preferable for the control unit to decrease the generated electric current produced from the fuel cell stack in accordance with a difference (e.g., the cancellation determination voltage value ΔV described later) between a lowest cell voltage value of the fuel cell stack and the threshold decreasing, during execution of the low stoichiometry control.

With the present invention, since power generation can be more reliably stabilized by decreasing the generated electric current produced from the fuel cell stack accompanying the difference between the lowest cell voltage value and the above-mentioned predetermined threshold decreasing, i.e. accompanying the power generation stability of the fuel cell stack worsening until there is no alternative but to cancel the low stoichiometry control, it is possible to continually maintain the power generation in the low stoichiometry state over a longer period of time.

In this case, it is preferable for the control unit to maintain a supplied amount of oxidant gas to the fuel cell stack to be constant, during execution of the low stoichiometry control.

With the present invention, since power generation can be stabilized and the lowest cell voltage value suppressed from excessively declining by continually maintaining the supplied amount of oxidant gas constant, while decreasing the generated electric current from the fuel cell stack in the aforementioned way, it is possible to continually maintain the power generation in the low stoichiometry state over a longer period of time.

In this case, it is preferable for the control unit to execute the low stoichiometry control in response to a predetermined idling stop initiation condition having been satisfied during idling power generation, with an event of the lowest cell voltage value of the fuel cell stack having fallen below the threshold as a cancellation condition for the low stoichiometry control.

With the present invention, with the event of the lowest cell voltage value falling below the threshold as the cancellation condition of low stoichiometry control, low stoichiometry control is executed in accordance with a predetermined idling stop initiation condition having been satisfied during idling power generation, and the fuel cell stack is set to the state of idling stop. It is thereby possible to maintain the state of idling stop in which deterioration of the fuel cell stack is low, over a long time period, irrespective of the state of the cells at this time.

In this case, it is preferable for the control unit to execute the low stoichiometry control during system stop processing after an ignition switch has been turned off.

With the present invention, the aforementioned such low stoichiometry control is executed during system stop processing after the ignition switch has been turned off. In other words, the low stoichiometry control is executed in a period from the ignition switch being turned off until power generation by the fuel cell stack is made to completely stop, and the low stoichiometry state is maintained over a long time period, whereby fuel gas staying inside the system is sufficiently consumed irrespective of the state of the cells at this time, upon which power generation by the fuel cell stack can be made to completely stop.

In order to achieve the above-mentioned object, the present invention provides a method for controlling a fuel cell system including a fuel cell stack having stacked together a plurality of fuel cells that generate power when fuel gas and oxidant gas are supplied thereto, and an electrical load that is connected to the fuel cell stack, and consumes electric power generated by the fuel cell stack. The control method includes: an idling power generation step (e.g., the process of time t0 to t1 in FIG. 5 described later) of producing a predetermined amount of a generated electric current while supplying a predetermined amount of oxidant gas to the fuel cell stack; and a low stoichiometry control step (e.g., the process of time t1 to t4 in FIG. 5 described later) of decreasing both a supplied amount of the oxidant gas to the fuel cell stack and the generated electric current produced from the fuel cell stack to less than during the idling power generation step, within a range larger than 0, in which the generated electric current produced from the fuel cell stack is lowered as a lowest cell voltage value (e.g., the lowest cell voltage value CV_low described later) of the fuel cell stack decreases, so that the lowest cell voltage value of the fuel cell stack does not fall below a predetermined threshold (e.g., the cancellation threshold B described later), in the low stoichiometry control step.

In this case, it is preferable for the generated electric current produced from the fuel cell stack to be decreased in accordance with a difference (e.g., the cancellation determination voltage value ΔV described later) between the lowest cell voltage value of the fuel cell stack and the threshold decreasing, in the low stoichiometry control step.

In this case, it is preferable for the supplied amount of the oxidant gas to the fuel cell stack to be maintained to be constant in the low stoichiometry control step.

In this case, it is preferable for the low stoichiometry control step to be executed in response to a predetermined idling stop initiation condition having been satisfied during the idling power generation step, with an event of the lowest cell voltage value of the fuel cell stack having fallen below the threshold as a cancellation condition for the low stoichiometry control step.

In this case, it is preferable for the low stoichiometry control step to be executed during system stop processing after an ignition switch has been turned off.

The same effects as the aforementioned invention of a fuel cell system are exerted by the present invention.

BRIEF DESCRIPTION OF THE DRAWINGS

FIG. 5 is a time chart showing the changes in lowest cell voltage value, discharge current value, and air pump revolution speed during the execution of idling stop control according to the embodiment; and FIG. 6 is a time chart showing a procedure of system stop processing of a fuel cell system according to a second embodiment of the present invention.

DETAILED DESCRIPTION OF THE INVENTION

First Embodiment

Hereinafter, a first embodiment of the present invention will be explained while referencing the drawings.

Figure 1:
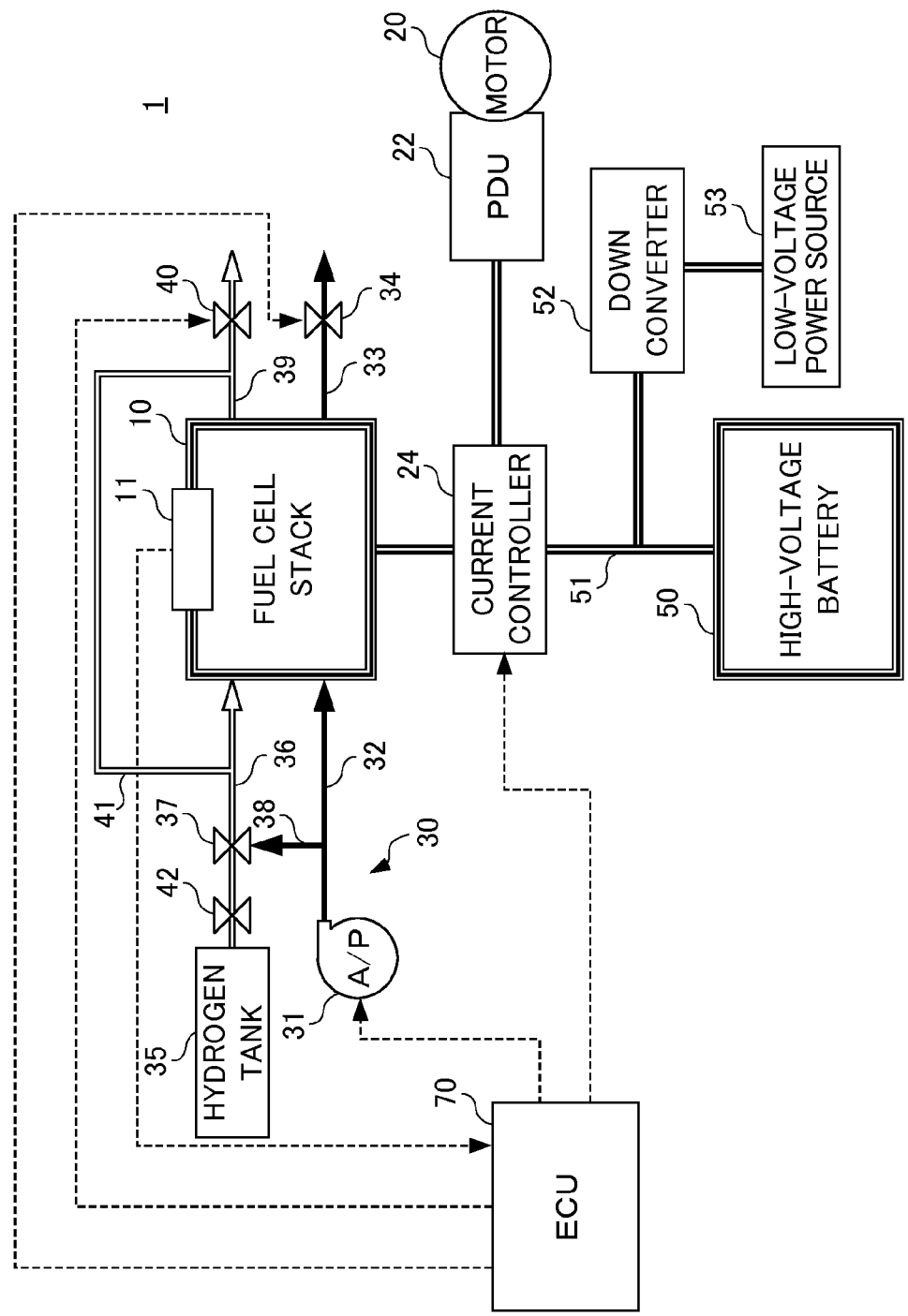
FIG. 1 is a block diagram showing a fuel cell system according to a first embodiment of the present invention.

FIG. 1 is a block diagram of a fuel cell system 1 according to the present embodiment.

The fuel cell system 1 includes a fuel cell stack 10, a motor 20 that rotationally drives wheels that are not illustrated, a supply device 30 that supplies hydrogen gas as fuel gas and air as oxidant gas to the fuel cell stack 10, a high-voltage battery 50 that stores electric power, and an electronic control unit (hereinafter referred to as "ECU") 70. This fuel cell system 1 is equipped to a fuel cell vehicle (not illustrated) that travels using the electric power generated by the fuel cell stack 10 to drive the motor 20.

The fuel cell stack (hereinafter simply referred to as "stack") 10 is a stack structure in which from several tens to several hundreds of cells are stacked. Each fuel cell is configured by sandwiching a membrane electrolyte assembly (MEA) with a pair of separators. The membrane electrode assembly is configured by the two electrodes of an anode and a cathode, and a solid polymer electrolyte membrane sandwiched by these electrodes. Usually, both electrodes are formed from a catalyst layer contacting the solid polymer electrolyte membrane and carrying out oxidation and reduction reactions, and a gas diffusion layer contacting this catalyst layer. When hydrogen gas is supplied to the anode channel formed on the anode side thereof and air is supplied to a cathode channel formed to the cathode side thereof, this stack 10 generates power by way the electrochemical reaction between these.

In order to detect the power generation state of the above such stack 10, a cell voltage sensor 11 is provided to the stack 10. Upon dividing the stack 10 into cell groups constituted by one or at least two single cells, the cell voltage sensor 11 detects the voltage of each cell group (hereinafter referred to as "cell voltage"), and transmits a signal substantially proportional to the detection value to the ECU 70.

The supply device 30 is configured to include an air pump 31 that supplies air to the cathode channel of the stack 10, and a hydrogen tank 35 that supplies hydrogen gas to the anode channel of the stack 10.

The air pump 31 is connected to one end side of the cathode channel of the stack 10 via an air supply line 32. An air discharge line 33 is connected to the other end side of the cathode channel of the stack 10. A back-pressure valve 34 that controls the pressure inside the cathode channel of the stack 10 is provided in this air discharge line 33.

The hydrogen tank 35 is connected to one end side of the anode channel of the stack 10 via a hydrogen supply line 36. In order from the hydrogen tank 35 side towards the side of the stack 10, a shutoff valve 42 that interrupts the supply of hydrogen gas from the hydrogen tank 35 and a regulator 37 are provided in this hydrogen supply line 36. This regulator 37 controls not only the supplied amount of hydrogen gas to the stack 10, but also the hydrogen gas pressure in the anode channel of the stack 10, by a channel 38 branching from the air supply line 32 being connected thereto, the pressure inside of the air supply line 32 serving as a signal pressure, and the regulator 37 opening or closing depending on the level of this signal pressure. More specifically, when the pressure inside of the air supply line 32 rises, the regulator 37 operates to the opening side in order to raise the hydrogen gas pressure to match this.

A hydrogen discharge line 39 leading to a diluter that is not illustrated is provided to the other end side of the anode channel of the stack 10. A purge valve 40 for discharging hydrogenous gas discharged from the stack 10 is provided to this hydrogen discharge line 39. In addition, a hydrogen recirculation line 41 branching from stack 10 side of the purge valve 40 and leading more toward the stack 10 side of the regulator 37 in the above-mentioned hydrogen supply line 36 is provided to this hydrogen discharge line 39.

In the present embodiment, an anode system in which hydrogen gas flows is configured by the anode channel of the stack 10, hydrogen supply line 36, hydrogen discharge line 39 and hydrogen recirculation line 41, and a cathode system in which air flows is configured by the cathode channel of the stack 10, air supply line 32 and air discharge line 33.

The stack 10 is connected to a high-voltage battery 50 and a PDU (Power Drive Unit) 22 of the motor 20 via a current controller 24.

The PDU 22 includes a PWM inverter, and controls the driving operation and regeneration operation of the motor 20 by way of pulse width modulation (PWM). During driving of the motor 20, for example, the PDU 22 converts DC electric power output from the stack 10 and high-voltage battery 50 into three-phase AC electric power to supply to the motor 20, and causes drive torque to be produced in this motor 20. In addition, during regeneration of the motor 20, for example, the PDU 22 converts the three-phase AC electric power output from the motor 20 into DC electric power, and recharges the high-voltage battery 50.

The high-voltage battery 50 saves electric power generated by the stack 10, and applies this as appropriate such as during the startup of the stack 10. This high-voltage battery 50 is configured by a rechargeable battery such as a lithium-ion battery, or capacitors, for example. The current controller 24 is configured to include a DC/DC converter, and controls the generated electric current produced from the stack 10 based on a current command value decided by the ECU 70. The motor 20 rotates the drive wheels, which are not illustrated, by way of the electric power generated by the stack 10 and the electric power of the high-voltage battery 50.

In addition, a low-voltage source 53 of a voltage lower than the above-mentioned high-voltage battery 50 is connected, via a down converter 52, to a power line 51 connecting the current controller 24 and the high-voltage battery 50.

In the fuel cell system 10 configured as described above, the air pump 31 for controlling the supplied amount of air to the stack 10, the back-pressure valve 34 for controlling the pressure inside the cathode channel of the stack 10, the purge valve 40 for introducing gas in the anode system to the diluter, and the current controller 24 for controlling the generated electric current produced from the stack 10 are controlled by the ECU 70.

Next, idling stop control of the fuel cell system as low-stoichiometry control by the ECU will be explained.

Figure 2:
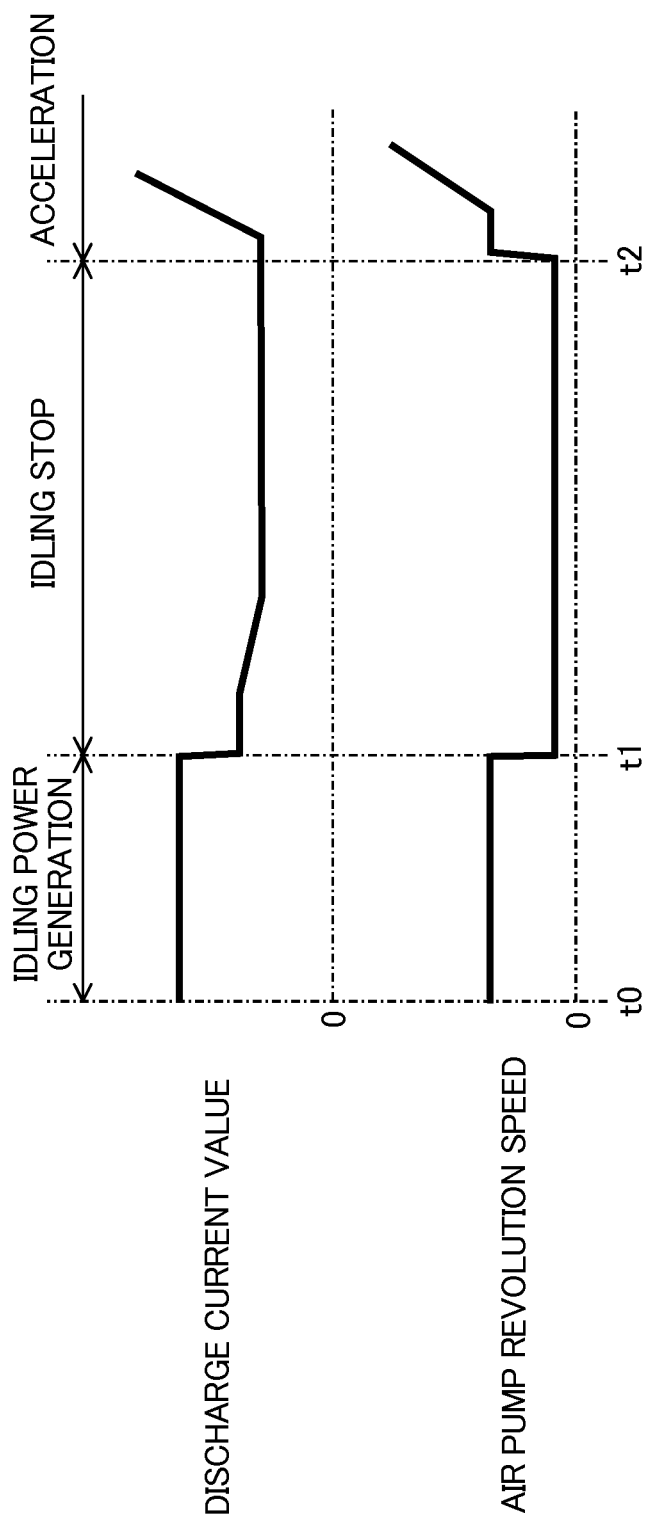
FIG. 2 is a time chart showing an example of a procedure of idling stop control according to the embodiment.

FIG. 2 is a time chart showing an example of a procedure of idling stop control. More specifically, it is a time chart showing changes in the value of the generated electric current of the stack, the revolution speed of the air pump, and the like in a period after temporarily stopping from a state travelling using the electric power generated by the stack, i.e. a state in which the fuel cell vehicle is in motion, at time t0 to wait at a traffic signal or the like, for example, until initiating travelling again in response to an acceleration request from the driver at time t2.

After the vehicle temporarily stops and the stack enters a state of idling power generation by the supplied amount of air and hydrogen gas to the stack being decreased in response thereto (refer to time t0), the ECU sets the stack from the state of idling power generation to the state of idling stop in response to a predetermined idling stop initiation condition having been satisfied (refer to time t1). More specifically, the stack is set to the state of idling stop by decreasing both the revolution speed of the air pump proportional to the supplied amount of air to the stack and the generated electric current produced from the stack to less than during idling power generation within a range larger than 0. Thereafter, the ECU causes the revolution speed of the air pump to rise as needed in response to the predetermined idling stop cancellation condition having been satisfied (refer to time t2).

Herein, the event of dilution gas of an adequate amount having been introduced into the diluter can be exemplified as the idling stop initiation condition, for example. In addition, the event of an acceleration request originating from the driver and the event of the lowest cell voltage having fallen below a cancellation threshold described later can be exemplified as the idling stop cancellation condition, for example.

In addition, the generated electric current produced from the stack during idling power generation and during idling stop, which do not require driving a motor, is supplied to the air pump, supplied to the high-voltage battery, supplied to a low-voltage source via the down converter, or supplied to a discharge resistor provided independently from these loads. In the present embodiment, the generated electric current of the stack supplied to loads other than these motors is specifically referred to as discharge current.

The state of idling stop refers to being in an unstable power generation state compared to the state of idling power generation, due to further lowering the revolution speed of the air pump than during idling power generation and continuing discharge under the supply of air of a low flowrate. Therefore, in idling stop control of the present embodiment, the current command value during idling stop is set through the procedure illustrated below in order to maintain a state of idling stop that is unstable compared to idling power generation over a long period of time, whereby the discharge current of the stack is controlled.

Figure 3:
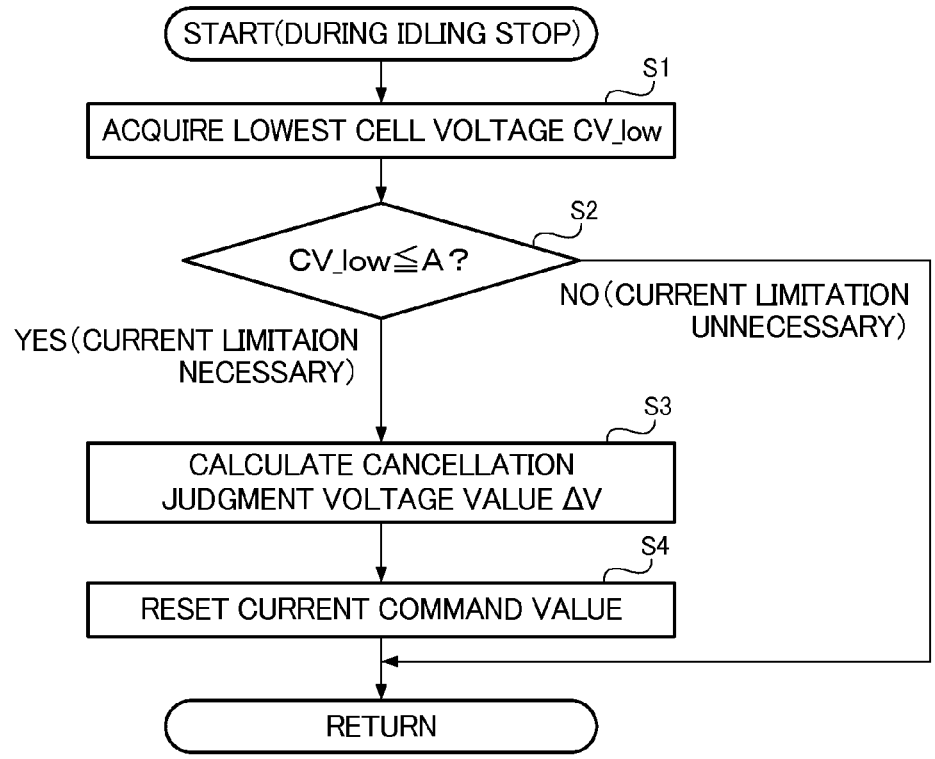
FIG. 3 is a flowchart showing a procedure of setting a current command value during idling stop.

FIG. 3 is a flowchart showing a procedure of setting the current command value during idling stop. The processing shown in FIG. 3 is repeatedly executed every predetermined control cycle by the ECU while an idling stop flag is set to "1", indicating being in a state in which setting to idling stop is being requested. It should be noted that this idling stop flag is set from "0" to "1" in response to the aforementioned idling stop initiation condition having been satisfied, by way of processing that is not illustrated, after which it is reset from "1" to "0" in response to the aforementioned idling stop cancellation condition having been satisfied.

In Step S1, based on the output from the cell voltage sensor, the value that is the lowest among the cell voltage values CVn of each cell group constituting the stack is acquired, and this is defined as the lowest cell voltage value CV_low.

In Step S2, it is determined whether the lowest cell voltage value CV_low thus acquired in Step S1 is no more than a predetermined limitation initiation threshold A. In the case of the determination in Step S2 being NO, the stability of power generation by the stack is being ensured under the present current command value; therefore, it is determined that there is no necessity to limit the discharge current, and this processing is terminated.

In the case of the determination in Step S2 being YES, it is determined that the stability of power generation by the stack cannot be maintained under the present discharge current command value, and the processing advances to Step S3 in order to limit the discharge current so that the lowest cell voltage value CV_low does not fall below a cancellation threshold B set as the cancellation condition of idling stop. In Step S3, a cancellation determination voltage value $\Delta V$ (=CV_low−B) is calculated by subtracting the cancellation threshold B of idling stop control from the lowest cell voltage value CV_low acquired in Step S1. Then, in Step S4, after the current command value has been reset by searching a control map established in advance based on the cancellation determination voltage value $\Delta V$, this processing is terminated.

Figure 4:
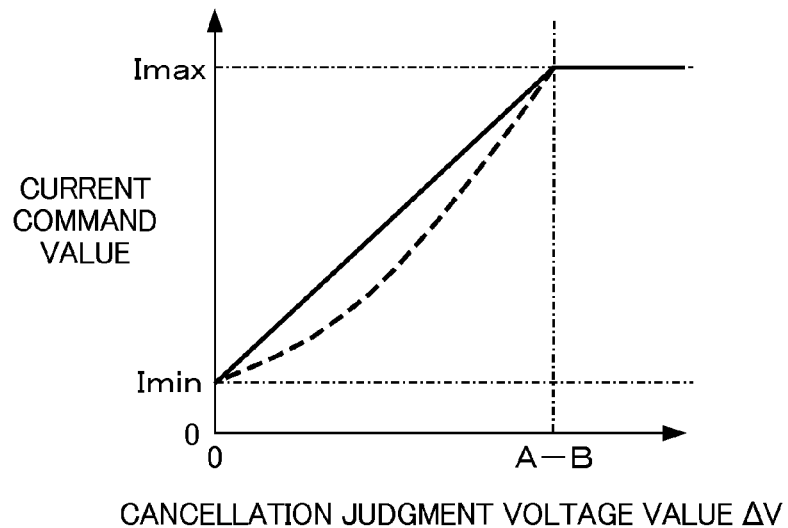
FIG. 4 is a graph showing an example of a control map for deciding a current command value based on a cancellation determination voltage value.

FIG. 4 is a graph showing an example of a control map for deciding the current command value based on the cancellation determination voltage value $\Delta V$.

In FIG. 4, the current command value is set to a maximum value Imax in a case of the cancellation determination voltage value $\Delta V$ being greater than a threshold A-B set in order to initiate current limitation. In addition, in a case of the cancellation determination voltage value $\Delta V$ being no more than the above-mentioned threshold A-B, the current command value is set so as to be a smaller value as the cancellation determination voltage value $\Delta V$ becomes smaller between the above-mentioned maximum value Imax and a minimum value Imin that is greater than 0.

It should be noted that, in addition to the map illustrated by the solid line in FIG. 4, the map illustrated by the dashed line may be used as the control map for deciding the current command value. In other words, it may be configured so that the current command value is made to quickly decline in response to a decline in $\Delta V$ in a case of the cancellation determination voltage value $\Delta V$ being large, and the current command value is made to gradually decline in response to a decline in $\Delta V$ in a case of the cancellation determination voltage value $\Delta V$ being small.

FIG. 5 is a time chart showing changes in the lowest cell voltage value, discharge current value, and air pump revolution speed during the execution of the aforementioned such idling stop control. In addition, FIG. 5 shows from the vehicle temporarily stopping and the stack entering the state of idling power generation at time t0, until subsequently initiating travel again in response to the acceleration request of the driver at time t4. It should be noted that, for comparison, FIG. 5 shows the lowest cell voltage value and discharge current value in the case of continually maintaining the current command value constant irrespective of the lowest cell voltage value by the dotted lines.

First, the stack enters the state of idling power generation due to the vehicle temporarily stopping at time t0. FIG. 5 shows the revolution speed of the air pump as R1 and the discharge current value as I1 during idling power generation.

Next, in response to the idling stop initiation condition having been satisfied at time t1, the revolution speed of the air pump is made to decline from the revolution speed during idling power generation (R1→R2). At this time, the discharge current value is also made to decline from that during idling power generation by also causing the current command value to decline together with the revolution speed of the air pump (I1→I2). The stack thereby is in the state of idling stop At time t1 and after.

In addition, if both the revolution speed of the air pump and the discharge current value are made to decline more than during idling power generation, the power generation of the stack will become unstable; therefore, the lowest cell voltage value may gradually decline at time t1 and after.

As shown by the dotted lines in FIG. 5, in a case of continually making the current command value constant during idling stop, the decline in the discharge current value can be suppressed; however, the power generation of the stack will become further unstable due to the produced water yielded in power generation, and the lowest cell voltage value will decline drastically. Then, at time t3, the state of idling stop is cancelled in response to the lowest cell voltage value having fallen below the cancellation threshold B. It should be noted that, after cancelling idling stop, the lowest cell voltage is made to recover by setting the current command value to 0 while maintaining the revolution speed of the air pump constant and stopping only the discharge of the stack, as shown by the dotted line in FIG. 5; however, the present invention is not limited thereto.

In contrast, in the present embodiment, the current command value is decreased in accordance with the decline in the lowest cell voltage value, while maintaining the revolution speed of the air pump constant, in response to the lowest cell voltage value having fallen below the limitation initiation threshold A at time t2, after setting the stack to idling stop at time t1, as shown by the solid line in FIG. 5. Although the discharge current value thereby temporarily declines compared to a case of continually maintaining the current command value constant, the lowest cell voltage value is maintained at a higher value than the cancellation threshold B, and thus it is possible to continually maintain a state of idling stop until time t4 at which an acceleration request originates from the driver.

The following effects are exerted according to the present embodiment.

(1) In the present embodiment, idling stop control is executed, and the stack is set to the state of idling stop by decreasing both the supplied amount of air to the stack and discharge current to less than during idling power generation within a range greater than 0. Since it is thereby possible to prevent oxygen staying in the vicinity of the MEA of each fuel cell from coexisting with hydrogen, and to avoid the fuel cell stack from entering a high-voltage state, the fuel cell stack can be suppressed from deteriorating. In addition, in the present embodiment, the discharge current of the stack is lowered as the lowest cell voltage value CV_low decreases, during idling stop control in which the power generation stability tends to be influenced by the cell state. It is thereby possible to prevent the lowest cell voltage value CV_low from declining so far as to fall below the cancellation threshold B, even in a case of the cell state not being favorable, and thus power generation can be maintained in a low stoichiometry state over a long time period.

(2) In the present embodiment, since power generation can be more reliably stabilized by decreasing the discharge current accompanying the cancellation determination voltage value $\Delta V$, which corresponds to a difference between the lowest cell voltage value CV_low and the cancelation threshold B, decreasing, i.e. accompanying the power generation stability of the stack worsening until there is no alternative but to cancel the idling stop, it is possible to continually maintain the state of idling stop over a longer period of time.

(3) In the present embodiment, since power generation can be stabilized and the lowest cell voltage value CV_low suppressed from excessively declining by continually maintaining the supplied amount of air constant, while decreasing the discharge current in the aforementioned way, it is possible to continually maintain the state of idling stop over a longer period of time.

(4) In the present embodiment, with the event of the lowest cell voltage value CV_low falling below the cancellation threshold B as the cancellation condition of idling stop, idling stop control is executed in accordance with a predetermined idling stop initiation condition having been satisfied during idling power generation, and the fuel cell stack is set to the state of idling stop. It is thereby possible to maintain the state of idling stop in which deterioration of the fuel cell stack is low, over a long time period, irrespective of the state of the cells at this time.

Second Embodiment

Next, a second embodiment of the present invention will be explained while referencing the drawings.

In the present embodiment, the time period for executing low stoichiometry control differs from the above-mentioned first embodiment. In the above-mentioned first embodiment, idling stop control is executed as low stoichiometry control in response to a predetermined idling stop initiation condition having been satisfied during idling power generation while the ignition switch is turned ON; however, in the present embodiment, low stoichiometry control is executed in a predetermined time period during system stop processing after the ignition switch has been turned off.

FIG. 6 is a time chart showing a procedure of system stop processing for causing power generation by the stack to completely stop. More specifically, it is a time chart showing a procedure of system stop processing from the ignition switch being turned off at time t0, until power generation by the stack is subsequently made to completely stop at time t3.

In the system stop processing, when the ignition switch is turned off, the presence of a failure such as of the shutoff valve or back-pressure valve over a predetermined time period while the stack remains set to the state of idling power generation is determined (refer to time t0 to t1).

When failure detection ends, the ECU executes $O_2$ lean power generation control as low stoichiometry control over a predetermined time, and sets the stack from the state of idling power generation to substantially the same state as the state of idling stop explained in the above-mentioned first embodiment. More specifically, along with closing the shutoff valve and back-pressure valve, both the revolution speed of the air pump and discharge current are decreased to less than during idling power generation (time t0 to t1) within a range greater than 0.

In addition, in order to limit the discharge current so that the lowest cell voltage value CV_low does not fall below a threshold D set to a value somewhat greater than 0 while executing the above such $O_2$ lean power generation control, the current command value is set to a smaller value as a determination voltage value $\Delta V$ ($=CV\_low-D$) obtained by subtracting the threshold D from the lowest cell voltage value CV_low decreases. It is thereby possible to maintain the lowest cell voltage value at a higher value than the threshold D, even in a case of the state of the cell not being favorable, as shown in FIG. 6. It should be noted that, since the procedure of setting the current command value is substantially the same as the procedure explained while referencing FIG. 3 in the first embodiment, a detailed explanation thereof will be omitted.

After executing the above such $O_2$ lean power generation control over a predetermined period of time to sufficiently consume the hydrogen gas staying in the system, down converter discharge control is executed (refer to time t2 to t3). More specifically, the revolution speed of the air pump is set to 0 and the discharge current is provided to a low-voltage source. In a case of the stack voltage sufficiently declining by executing this down converter discharge control, the connection between the stack and a current controller is cut by turning off a fuel cell contactor that is not illustrated, to cause the power generation by the stack to completely stop.

The following effect is exerted according to the present embodiment.

In the present embodiment, $O_2$ lean power generation control is executed as the aforementioned such low stoichiometry control in a period from the ignition switch being turned off until power generation by the stack is made to completely stop, and the low stoichiometry state is maintained over a long time period, whereby hydrogen gas staying inside the system is sufficiently consumed irrespective of the state of the cells at this time, upon which power generation by the stack can be made to completely stop.

What is claimed is:
1. A fuel cell system comprising:
a fuel cell stack having stacked together a plurality of fuel cells that generate power when supplied fuel gas and oxidant gas;
an electrical load that is connected to the fuel cell stack and consumes electric power generated by the fuel cell stack; and
a control unit that executes low stoichiometry control to decrease a supplied amount of oxidant gas to the fuel cell stack within a range greater than zero and less than during idling power generation, and decrease a generated electric current produced from the fuel cell stack within a range greater than zero and less than during the idling power generation, wherein the control unit causes generated electric current produced from the fuel stack to change so that the lowest cell voltage value of the fuel cell stack does not fall below a predetermined threshold, and decreases the generated electric current as a lowest cell voltage value of the fuel cell stack decreases, during execution of the low stoichiometry control.

2. The fuel cell system according to claim 1, wherein the control unit acquires a difference between a lowest cell voltage value of the fuel cell stack and the threshold, and decreases the generated electric current produced from the fuel cell stack as the difference decreases, so that the lowest cell voltage value of the fuel cell stack does not fall below the threshold, during execution of the low stoichiometry control.

3. The fuel cell system according to claim 2, wherein the control unit maintains a supplied amount of oxidant gas to the fuel cell stack to be constant, during execution of the low stoichiometry control.

4. The fuel cell system according to claim 3, wherein the control unit executes the low stoichiometry control in response to a predetermined idling stop initiation condition having been satisfied during idling power generation, with an event of the lowest cell voltage value of the fuel cell stack having fallen below the threshold as a cancellation condition for the low stoichiometry control.

5. The fuel cell system according to claim 1, wherein the control unit maintains a supplied amount of oxidant gas to the fuel cell stack to be constant, during execution of the low stoichiometry control.

6. The fuel cell system according to claim 1, wherein the control unit executes the low stoichiometry control in response to a predetermined idling stop initiation condition having been satisfied during idling power generation, with an event of the lowest cell voltage value of the fuel cell stack having fallen below the threshold as a cancellation condition for the low stoichiometry control.

7. A method for controlling a fuel cell system including a fuel cell stack having stacked together a plurality of fuel cells that generate power when fuel gas and oxidant gas are supplied thereto, and an electrical load that is connected to the fuel cell stack, and consumes electric power generated by the fuel cell stack, the method comprising:

an idling power generation step of producing a predetermined amount of a generated electric current while supplying a predetermined amount of oxidant gas to the fuel cell stack; and a low stoichiometry control step of decreasing a supplied amount of the oxidant gas to the fuel cell stack within a range greater than zero and less than during the idling power generation on step, and decreasing the generated electric current produced from the fuel cell stack within a range greater than zero and less than during the idling power generation step, wherein the generated electric current produced from the fuel cell stack is made to change so that the lowest cell voltage value of the fuel cell stack does not fall below a predetermined threshold, and the generated electric current is lowered as a lowest cell voltage value of the fuel cell stack decreases, in the low stoichiometry control step.

8. The method for controlling a fuel cell system according to claim 7, wherein a difference between a lowest cell voltage value of the fuel cell stack and the threshold is acquired, and the generated electric current produced from the fuel cell stack is decreased as the difference decreases, so that the lowest cell voltage value of the fuel cell stack does not fall below the threshold, in the low stoichiometry control step.

9. The method for controlling a fuel cell system according to claim 8, wherein the supplied amount of the oxidant gas to the fuel cell stack is maintained to be constant in the low stoichiometry control step.

10. The method for controlling a fuel cell system according to claim 9, wherein the low stoichiometry control step is executed in response to a predetermined idling stop initiation condition having been satisfied during the idling power generation step, with an event of the lowest cell voltage value of the fuel cell stack having fallen below the threshold as a cancellation condition for the low stoichiometry control step.

11. The method for controlling a fuel cell system according to claim 7, wherein the supplied amount of the oxidant gas to the fuel cell stack is maintained to be constant in the low stoichiometry control step.

12. The method for controlling a fuel cell system according to claim 7, wherein the low stoichiometry control step is executed in response to a predetermined idling stop initiation condition having been satisfied during the idling power generation step, with an event of the lowest cell voltage value of the fuel cell stack having fallen below the threshold as a cancellation condition for the low stoichiometry control step.

* * * * *